(12) United States Patent
Doering et al.

(10) Patent No.: US 11,252,086 B2
(45) Date of Patent: Feb. 15, 2022

(54) METHOD AND DEVICE FOR OPERATING A NETWORK COMPONENT AND A CONTROL INSTANCE IN A SOFTWARE-DEFINED NETWORKING COMMUNICATION INFRASTRUCTURE

(71) Applicant: Robert Bosch GmbH, Stuttgart (DE)

(72) Inventors: Michael Ernst Doering, Hildesheim (DE); Rene Guillaume, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 16/844,348

(22) Filed: Apr. 9, 2020

(65) Prior Publication Data

US 2020/0336419 A1 Oct. 22, 2020

(30) Foreign Application Priority Data

Apr. 16, 2019 (DE) .......................... 102019205489.7

(51) Int. Cl.
| | | |
|---|---|---|
| *H04L 12/715* | (2013.01) | |
| *H04L 12/26* | (2006.01) | |
| *G06F 9/455* | (2018.01) | |
| *H04L 12/759* | (2013.01) | |

(52) U.S. Cl.
CPC .......... *H04L 45/64* (2013.01); *G06F 9/45558* (2013.01); *H04L 43/10* (2013.01); *H04L 45/028* (2013.01); *G06F 2009/45595* (2013.01)

(58) Field of Classification Search
CPC ....... H04L 45/64; H04L 43/10; H04L 45/028; H04L 45/16; H04L 41/0654; H04L 41/0893; H04L 43/08; G06F 9/45558; G06F 2009/45595
See application file for complete search history.

(56) References Cited

U.S. PATENT DOCUMENTS

| | | | |
|---|---|---|---|
| 2006/0074968 A1* | 4/2006 | Gyetko | .............. H04L 12/1886 |
| 2012/0051229 A1* | 3/2012 | Feldmann | .............. H04L 43/12 370/242 |
| 2018/0013630 A1* | 1/2018 | Tatlicioglu | ............. H04L 41/12 |
| 2018/0376444 A1* | 12/2018 | Kim | ....................... H04W 4/70 |
| 2019/0052520 A1* | 2/2019 | Luo | .................... H04L 41/0668 |
| 2019/0068394 A1* | 2/2019 | Dawes | ............... H04L 12/2834 |

* cited by examiner

*Primary Examiner* — Michael A Keller
(74) *Attorney, Agent, or Firm* — Norton Rose Fulbright US LLP; Gerard Messina

(57) ABSTRACT

A method and device for operating a network component and a control instance in a software-defined networking communication infrastructure. The software-defined networking communication infrastructure is switched from an operation according to a first strategy for forwarding time-critical data streams in network components of the communication infrastructure to an operation according to a second strategy for forwarding time-critical data streams in network components as a function of at least one trigger signal, the at least one trigger signal being received in an operation according to the first strategy from a control instance in a unicast message or in a broadcast message.

11 Claims, 5 Drawing Sheets

METHOD AND DEVICE FOR OPERATING A NETWORK COMPONENT AND A CONTROL INSTANCE IN A SOFTWARE-DEFINED NETWORKING COMMUNICATION INFRASTRUCTURE

CROSS REFERENCE

The present application claims the benefit under 35 U.S.C. § 119 of German Patent Application No. DE 102019205489.7 filed on Apr. 16, 2019, which is expressly incorporated herein by reference in its entirety.

FIELD

The present invention is directed to a method and to a device for operating a network component and a control instance in a software-defined networking communication structure.

BACKGROUND INFORMATION

For such a communication infrastructure, it is desirable in the event of a disruption or of a connection failure to introduce countermeasures which at least partially ensure the transport of data.

SUMMARY

In accordance with the present invention, an example method for operating a network component in a software-defined networking communication infrastructure provides that the software-defined networking communication infrastructure is switched from an operation according to a first strategy for forwarding time-critical data streams in network components of the communication infrastructure to an operation according to a second strategy for forwarding time-critical data streams in network components as a function of at least one trigger signal, the at least one trigger signal in an operation according to the first strategy being received from a control instance in a multicast message or in a unicast message or in a broadcast message, it being checked during a check by the network component whether or not the second strategy is implementable, the network component transmitting a response message, which includes information about whether or not the second strategy is implemented or is implementable, to the control instance in response to the trigger message as a function of a result of the check. This allows for a consistent switching between two operating modes.

In accordance with the present invention, it may be advantageously provided that a switch is made from the operation according to the first strategy to the operation according to the second strategy if no abort message is received by a predefined switching point in time after the receipt of the trigger message. Thus, the switch is effectuated in the network component if no other network component gives cause to send the abort message.

In accordance with the present invention, it may be advantageously provided that after the receipt of the trigger message by a predefined switching point in time, it is checked whether an abort message is received, the operation according to the first strategy being maintained, if the abort message has been received by a predefined switching point in time, and a confirmation message being transmitted to the control instance in response to this abort message. The operation according to the first strategy is maintained in this operation in order to prevent a switching of individual components that would be capable thereof to the operation according to the second strategy if individual other network components do not switch to this operation. The confirmation makes it possible to retrace the switching process.

In accordance with the present invention, it may be advantageously provided that a configuration confirmation message is transmitted to the control instance after switching to the operation according to the second strategy. The configuration confirmation makes it possible to retrace the switch.

In accordance with the present invention, it may be advantageously provided that the trigger signal is signaled by a heartbeat signal received, in particular, regularly or cyclically by the network component, the switching from the operation according to the first strategy to the operation according to the second strategy being triggered if the trigger signal failed to appear or is changed. This allows for the switch by a network component to be triggered. Upon detection of a connection failure, for example, an individual switch may introduce countermeasures, which at least partially ensure the transport of data again.

In one example method for operating a control instance in a software-defined networking communication infrastructure, it may be provided that the software-defined networking communication infrastructure is switched from an operation according to a first strategy for forwarding time-critical data streams in network components of the communication infrastructure to an operation according to a second strategy for forwarding time-critical data streams in network components as a function of at least one trigger signal, the at least one trigger signal in an operation according to the first strategy being determined by a control instance and, in particular, being transmitted in a plurality of unicast messages or in a broadcast message to a plurality of network components, it being checked by the control instance whether a response message, which includes information about whether or not the second strategy is implementable, is received from at least one of the plurality of network components in response to the transmission of the trigger message, and an abort message being transmitted by the control instance, in particular, in a plurality of unicast messages or in a broadcast message if the second strategy is not implementable by at least one of the plurality of the network components, or if no information about whether or not the second strategy is implementable is received from at least one of the plurality of the network components by a predefined point in time after the transmission of the trigger message. The control instance may be a central control instance or one of the network components. An individual switch may, for example, act as a control instance upon detection of a connection failure and may introduce countermeasures, which at least partially ensure the transport of data again.

In accordance with the present invention, it may be advantageously provided that by a predefined confirmation point in time after the transmission of the trigger message, it is checked whether a configuration confirmation message has been received from at least one network component, which confirms that the network component is switched from the operation according to the first strategy to the operation according to the second strategy, and the abort message being transmitted, in particular, in a plurality of unicast messages or in a broadcast message if the second strategy is not implemented by at least one of the plurality of the network components, or if no information about whether or not the second strategy is implemented is received from at least one of the plurality of the network components by the confirmation point in time. In this way, a switching is prevented if not all network components involved are able to implement the second strategy.

In accordance with the present invention, it may be advantageously provided that it is checked whether a response message, which confirms that the second strategy is implemented, is received from all network components of the plurality of the network components, an abort message being transmitted if at least the second strategy is not implemented by at least one of the plurality of the network components, or if no information about whether or not the second strategy is implemented is received from at least one of the plurality of the network components by a predefined confirmation point in time after the transmission of the trigger message. In this way, a switching is aborted if not all network components involved have implemented the second strategy.

In accordance with the present invention, it may be advantageously provided that the trigger signal is signaled by a heartbeat signal transmitted, in particular, regularly or cyclically by the control instance, the switching from the operation according to the first strategy to the operation according to the second strategy being triggered if the trigger signal failed to appear or is changed. This represents a particularly effective signaling.

A network component in a software-defined networking communication infrastructure includes a processor, a memory and an interface to the communication infrastructure, and is designed to carry out the method for operating the network component.

A control instance in a software-designed networking communication infrastructure includes a processor, a memory and an interface to the communication infrastructure, and is designed to carry out the method for operating the control instance.

Additional advantageous specific embodiments may be derived from the following description and from the figures.

DETAILED DESCRIPTION OF EXAMPLE EMBODIMENTS

Figure 1:
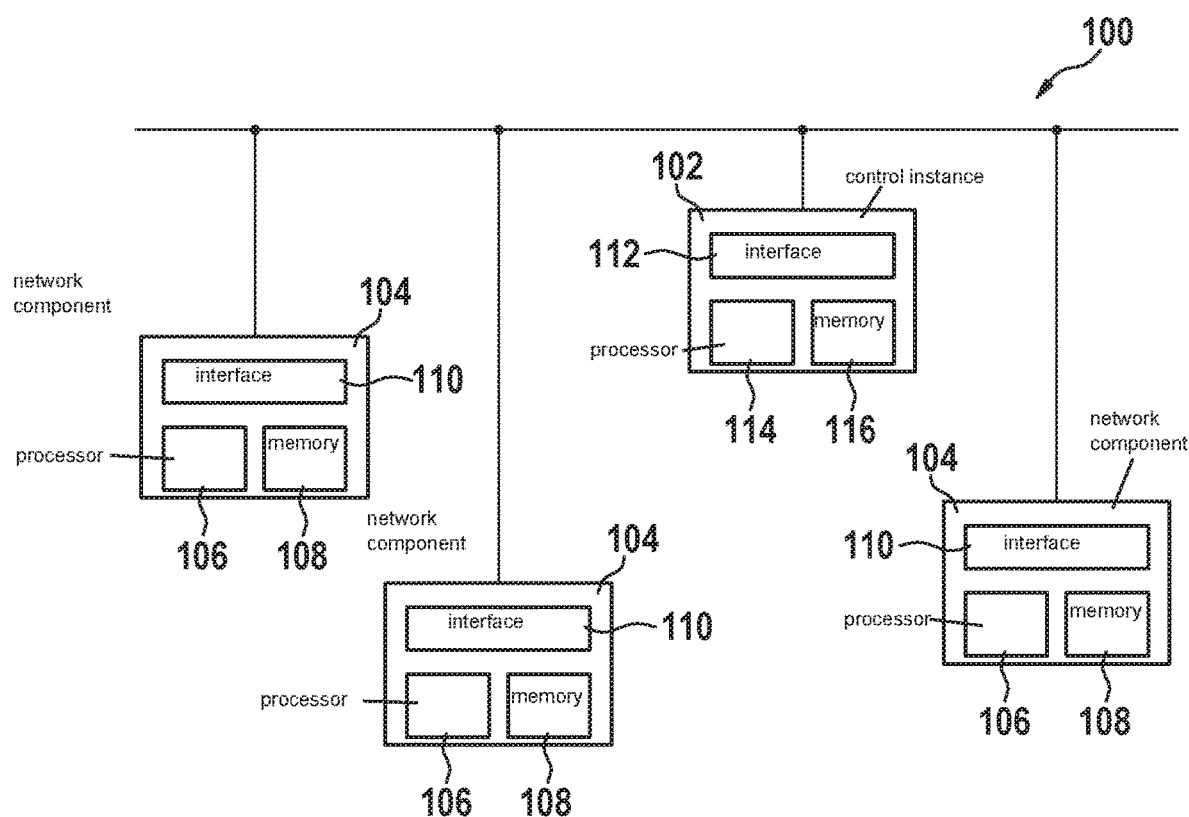
FIG. 1 schematically shows a representation of parts of a communication infrastructure.

FIG. 1 depicts parts of a communication infrastructure 100. Communication infrastructure 100 includes a control instance 102 and a plurality of network components 104.

Control instance 102 includes a software-defined networking controller as a logically centralized instance of communication infrastructure 100. The software-defined networking controller is connected via logic connections to network components 104 of communication infrastructure 100. Communication infrastructure 100 is designed, for example, as an Ethernet according to IEEE 802.3. In this case, network components 104 are designed, for example, as Ethernet switches. Communication infrastructure 100 may also be designed as a controller area network, CAN, according to ISO 11898. Instead of the Ethernet switches, forwarding devices, for example, are provided in this case, which communicate according to the CAN protocol and which are able to assume the function described for the switches. Switch and forwarding device are examples of network components 104, which may be used for operating communication infrastructure 100. Network components 104 in the example each include a processor 106 and in each case a memory 108 and an interface 110 to communication infrastructure 100. Processor 106 and memory 108 may be designed as a microprocessor, as at least one application-specific integrated circuit, ASIC, as at least one field programmable gate array, FPGA, or including at least one ternary content addressable memory, TCAM.

Control instance 102 in the example includes an interface 112 to communication interface 100, a processor 114 and a memory 116. The latter may be designed as a microprocessor, as at least one application-specific integrated circuit, ASIC, as at least one field programmable gate array, FPGA or including at least one ternary content addressable memory, TCAM.

Instructions, upon execution of which by the processors the respective method described below is run, are stored in the memories.

According to the first method of the present invention, software-defined networking communication infrastructure 100 is switched as a function of at least one trigger signal from an operation according to a first strategy for forwarding time-critical data streams in network components 104 of communication structure 100 to an operation according to a second strategy for forwarding time-critical data streams in network components.

Figure 2:
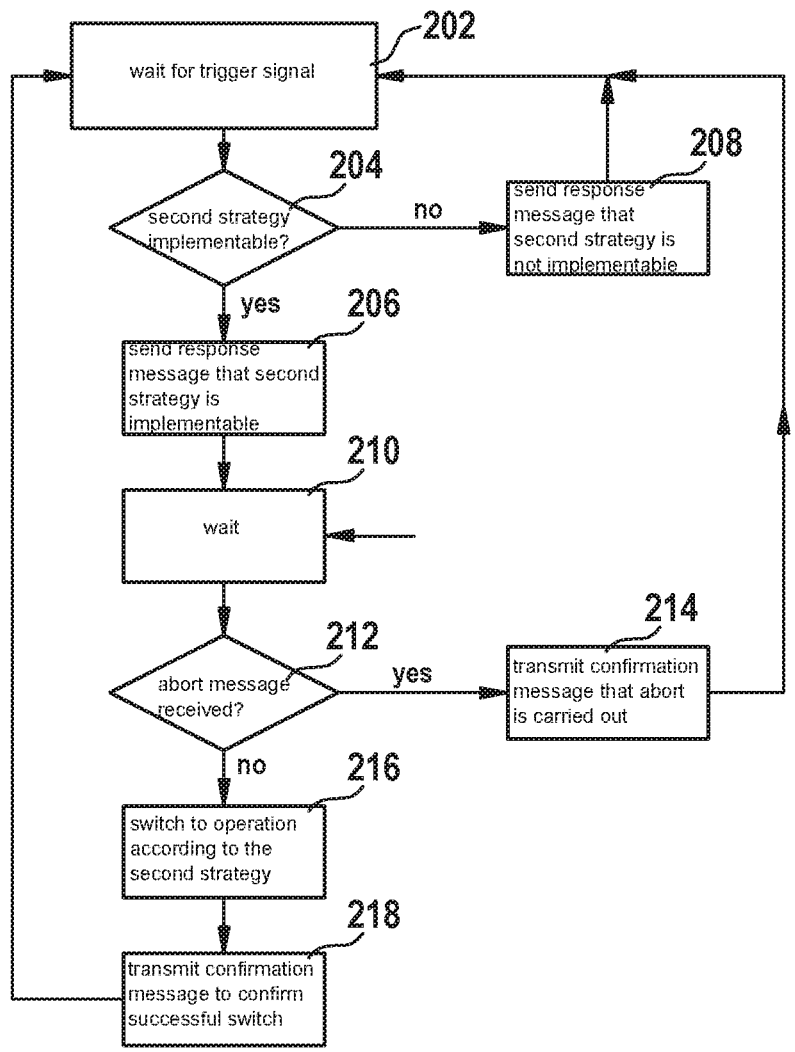
FIG. 2 shows steps in a network component according to a first method for operating the communication infrastructure in accordance with the present invention.

FIG. 2 depicts steps in network component 104 according to a first example method for operating communication infrastructure 100 in accordance with the present invention.

A trigger signal is awaited in a step 202. If a trigger signal is received, step 204 is carried out. A time measurement is optionally started, which measures the time that has elapsed since the reception of the trigger signal. The trigger signal is received in an operation according to the first strategy from control instance 102 in a multicast message, a unicast message or in a broadcast message.

In step 204, it is checked in a check by network component 104 whether or not the second strategy is implementable.

If the second strategy is implementable, a step 206 is carried out. Otherwise, a step 208 is carried out.

In step 206, a response message is sent by network component 104 to control instance 102 in response to the trigger message as a function of a result of the check, which includes the information that the second strategy is implementable.

A step 210 is subsequently carried out.

In step 208, a response message is sent by network component 104 to control instance 102 in response to the trigger message as a function of a result of the check, which includes the information that the second strategy is not implementable.

Step 202 is subsequently carried out.

Step 210 involves waiting with the aid of a time measurement up to a predefined switch point in time after the receipt of the trigger message. The time measurement is used for this purpose.

If the predefined switch point in time after the receipt of the trigger message is reached, a step 212 is carried out.

In step 212, it is checked whether an abort message has been received since the start of the time measurement or since the receipt of the trigger message. If an abort message has been received, a step 214 is carried out. If no abort message has been received, a step 216 is carried out.

In step 214, a confirmation message is transmitted to control instance 102 in response to this abort message. This message confirms that the abort is carried out by network component 104.

Step 202 is subsequently carried out.

In step 216, network component 104 is switched to the operation according to the second strategy.

A step 218 is subsequently carried out.

In step 218, a configuration confirmation message is transmitted to the control instance after switching to the operation according to the second strategy. The configuration confirmation message confirms the successful switch to the operation according to the second strategy.

Step 202 is subsequently carried out.

Figure 3:
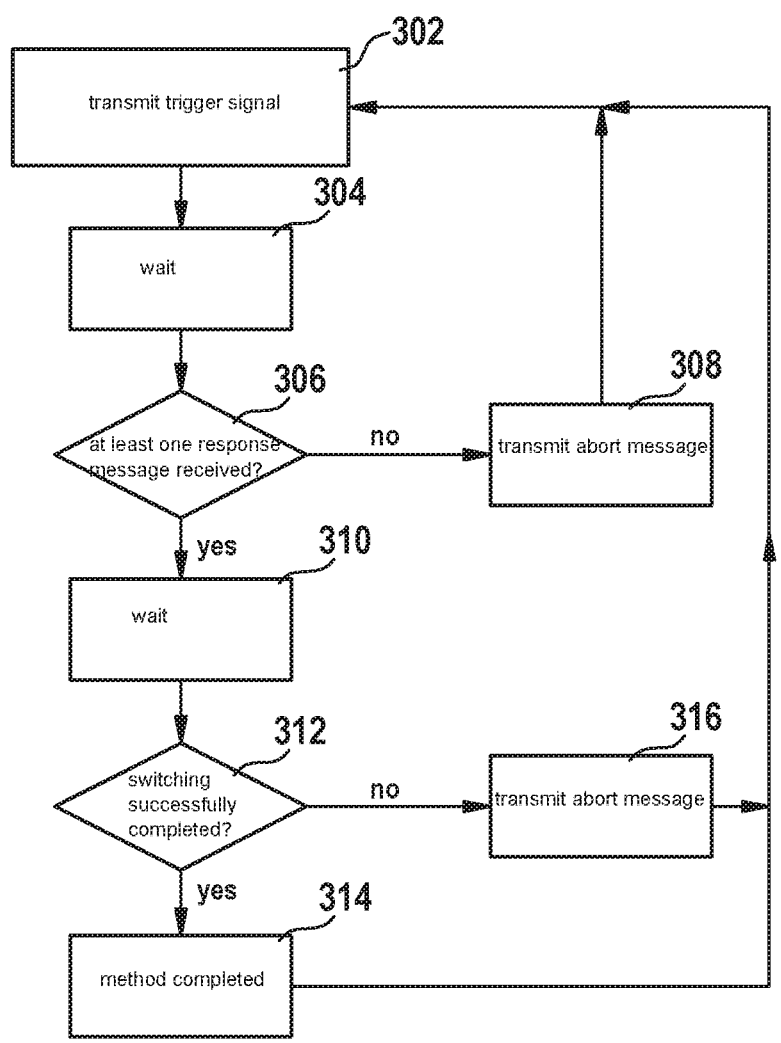
FIG. 3 shows steps in a control instance according to the first method for operating the communication structure in accordance with the present invention.

FIG. 3 schematically depicts steps in a control instance 102 according to the first method for operating the communication infrastructure in accordance with the present invention.

In a step 302, a trigger signal is transmitted. Step 304 is subsequently carried out. A time measurement is optionally started, which measures the time that has elapsed since the transmission of the trigger signal. The trigger signal is transmitted in an operation according to the first strategy by control instance 102 in a multicast message, in a unicast message or in a broadcast message.

Step 304 involves waiting for the receipt of at least one response message. Optionally, waiting is involved up to a predefined point in time after the transmission of the trigger message with the aid of the time measurement.

If a response message is received or, optionally, if the predefined point in time after the transmission of the trigger message is reached, it is checked in a step 306 in a check by control instance 102 whether at least one response message has been received by control instance 102, which includes the information whether or not the second strategy is implementable. If the second strategy is not implementable by at least one of the plurality of network components 104, or if a response message has not been received from any of the plurality of the network components, a step 308 is carried out.

Otherwise, a step 310 is carried out.

In step 308, an abort message is sent by the control instance. The abort message is transmitted, in particular, in a multicast message, in a plurality of unicast messages or in a broadcast message.

Step 302 is subsequently carried out.

Step 310 involves waiting for at least one configuration confirmation message that confirms that the second strategy is implemented, with the aid of the time measurement up to a confirmation point in time.

If the confirmation point in time is reached, it is checked in a step 312 whether the switching is successfully completed. In the example, it is checked whether a configuration confirmation message has been received from all of network components 104. If it is detected that the switching is successfully completed, a step 314 is carried out. Otherwise a step 316 is carried out.

The method is successfully completed in step 314.

The abort message is transmitted in step 316.

The abort message is transmitted if the second strategy is not implemented by at least one of the plurality of the network components, or if no information about whether or not the second strategy is implemented is received from at least one of the plurality of the network components by the predefined confirmation point in time after the transmission of the trigger message.

Step 302 is optionally carried out after step 314 or after step 316 in order to start a new reconfiguration.

Figure 4:
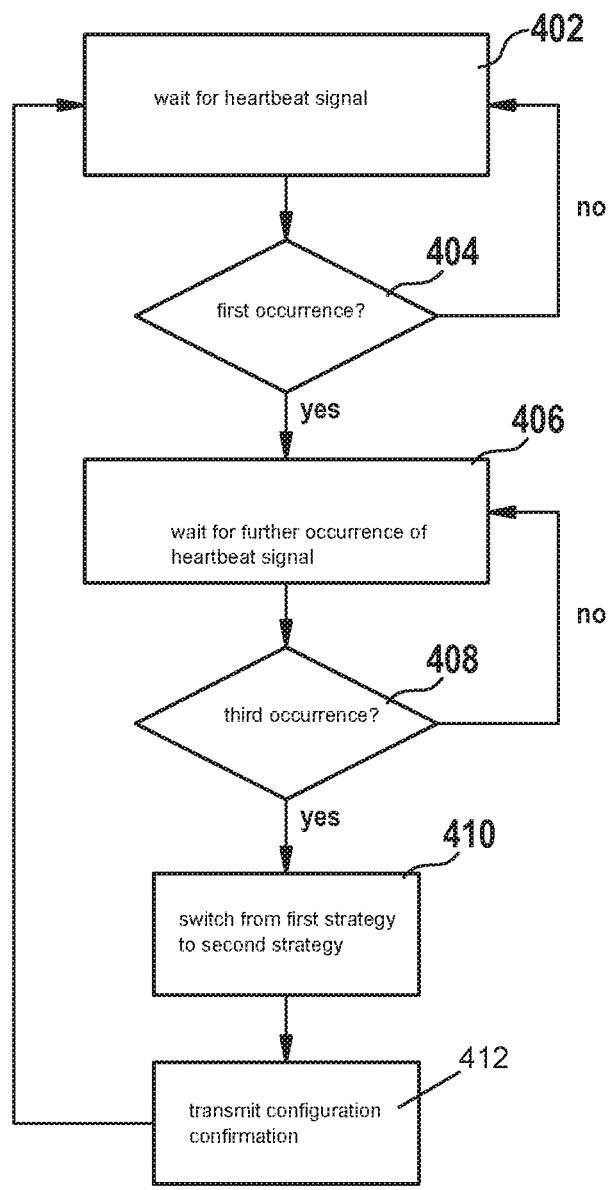
FIG. 4 shows steps in a network component according to a second method for operating the communication structure in accordance with the present invention.

FIG. 4 describes steps in network component 104 according to a second method for operating communication infrastructure 100.

The trigger signal in this case is signaled by a heartbeat signal received, in particular, regularly or cyclically by the network component. The switching of the operation according to the first strategy to the operation according to the second strategy is triggered if the heartbeat signal failed to appear or is changed.

A step 402 involves waiting for a heartbeat signal. If a heartbeat signal is received, it is checked in a step 404 whether or not it is a first occurrence of the heartbeat signal. If this is the case, a step 406 is carried out. Otherwise, step 402 is carried out.

Step 406 involves waiting for a further occurrence of the heartbeat signal. If a further heartbeat signal occurs, it is checked in a step 408 whether it is a third occurrence of the first heartbeat signal. If this is the case, a step 410 is carried out. Otherwise, step 406 is carried out. If the third heartbeat signal arrives after the first heartbeat signal, it is detected that the second heartbeat signal is missing. This is detected as a trigger signal for the switching. It may also be provided that a second heartbeat signal differing from the first heartbeat signal is transmitted as the trigger signal and this is detected by network component 104.

In step 410, a switch is made from an operation according to a first strategy for forwarding time-critical data streams in network components of the communication infrastructure to an operation according to a second strategy for forwarding time-critical data streams in network components.

A step 412 is subsequently carried out. In step 412 the configuration confirmation message is transmitted to control instance 102.

Step 402 is subsequently carried out.

Figure 5:
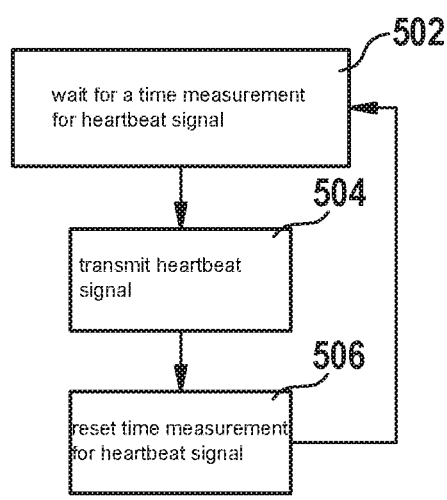
FIG. 5 shows steps in a control instance according to the second method for operating the communication structure in accordance with the present invention.

FIG. 5 depicts steps in control instance 102 according to the second method for operating communication infrastructure 100 in accordance with the present invention.

A step 502 involves waiting for a time measurement for the heartbeat signal. If the time for the occurrence of a heartbeat signal is reached a step 504 is carried out.

A heartbeat signal is transmitted in step 504. The heartbeat signal in the example is designed in such a way that it is distinguishable whether a first, a second or a third heartbeat occurs, or the second heartbeat does not occur. During the operation according to the first strategy, a first heartbeat signal which contains all heartbeats is transmitted. A second heartbeat signal differing from the first heartbeat signal is transmitted as the trigger signal for switching from the operation according to the first strategy to the operation according to the second strategy, or the transmission of the first heartbeat signal does not occur.

A step 506 is subsequently carried out.

In step 506, the time measurement for the heartbeat signal is reset. Step 502 is subsequently carried out.

What is claimed is:

1. A method for operating a network component in a software-defined networking communication infrastructure, wherein the software-defined networking communication infrastructure is switched from an operation according to a first strategy for forwarding time-critical data streams in network components of the communication infrastructure to an operation according to a second strategy for forwarding time-critical data streams in the network components as a function of at least one trigger signal, the method comprising the following steps:
   receiving, by the network component, in an operation according to the first strategy from a control instance, the at least one trigger signal in a trigger message, the trigger message being a multicast message or a unicast message or in a broadcast message;
   checking, by the network component, whether or not the second strategy is implementable by the network component;
   transmitting, by the network component, a response message to the control instance in response to the trigger message as a function of a result of the checking, the response message including information about whether or not the second strategy is implementable by the network component;
   checking, by the network component, whether an abort message is received by the network component; and
   based on the checking, switching, by the network component, from the operation according to the first strategy to the operation according to the second strategy, when no abort message is received, by the network component, by a predefined switching point in time after the receiving of the trigger message.

2. The method as recited in claim 1, further comprising the following step:
   transmitting, by the network component, a configuration confirmation message to the control instance after switching to the operation according to the second strategy.

3. The method as recited in claim 1, wherein the trigger signal is signaled by a heartbeat signal received regularly or cyclically by the network component from the control instance, the switching from the operation according to the first strategy to the operation according to the second strategy being triggered if the trigger signal failed to appear or is changed.

4. A method for operating a network component in a software-defined networking communication infrastructure, wherein the software-defined networking communication infrastructure is switched from an operation according to a first strategy for forwarding time-critical data streams in network components of the communication infrastructure to an operation according to a second strategy for forwarding time-critical data streams in the network components as a function of at least one trigger signal, comprising the following steps:
   receiving, by the network component, in an operation according to the first strategy from a control instance, the at least one trigger signal in a trigger message, the trigger message being a multicast message or a unicast message or in a broadcast message;
   checking, by the network component, whether or not the second strategy is implementable by the network component;
   transmitting, by the network component, a response message to the control instance in response to the trigger message as a function of a result of the checking, the response message including information about whether or not the second strategy is implementable;
   after the receiving of the trigger message by a predefined switching point in time, checking, by the network component, whether an abort message is received, the operation according to the first strategy being maintained if the abort message has been received by a second predefined switching point in time and a confirmation message is transmitted by the network component to the control instance in response to the abort message.

5. A method for operating a control instance in a software-defined networking communication infrastructure, wherein the software-defined networking communication infrastructure is switched from an operation according to a first strategy for forwarding time-critical data streams in network components of the communication infrastructure to an operation according to a second strategy for forwarding time-critical data streams in network components as a function of at least one trigger signal, the method comprising the following steps:
   determining the at least one trigger signal by the control instance in an operation according to the first strategy;
   transmitting, by the control instance, the at least one trigger signal in a plurality of unicast messages or in a broadcast message, to a plurality of network components;
   checking, by the control instance, whether a response message, which includes information about whether or not the second strategy is implementable, is received from at least one of the plurality of network components in response to the transmission of the trigger message;
   transmitting an abort message by the control instance, in a plurality of unicast messages or in a broadcast message, if the second strategy is not implementable by at least one of the plurality of the network components, or if no information about whether or not the second strategy is implementable is received from at least one of the plurality of the network components by a predefined point in time after the transmission of the trigger message;
   checking, by the control instance, whether a configuration confirmation message, which confirms that the second strategy is implemented, is received from all network components of the plurality of network components, the abort message being transmitted when the second strategy is not implemented by at least one of the plurality of the network components, or when no configuration confirmation message, which confirms that the second strategy is implemented, is received from at least one of the plurality of the network components by the predefined confirmation point in time after the transmission of the trigger message.

6. The method as recited in claim 5, further comprising the following steps:
   checking, by the control instance, by a predefined confirmation point in time after the transmission of the trigger message, whether a configuration confirmation message has been received from at least one network component, which confirms that the network component is switched from the operation according to the first strategy to the operation according to the second strategy; and transmitting the abort message, in a plurality of unicast messages or in a broadcast message, if the second strategy is not implemented by at least one of the plurality of the network components, or if no information about whether or not the second strategy is implemented is received from at least one of the plurality of the network components by the confirmation point in time.

7. The method as recited in claim 5, wherein the trigger signal is signaled by a heartbeat signal transmitted regularly or cyclically by the control instance, the switching from the operation according to the first strategy to the operation according to the second strategy being triggered if the trigger signal failed to appear or is changed.

8. A network component in a software-defined networking communication infrastructure, wherein the software-defined networking communication infrastructure is switched from an operation according to a first strategy for forwarding time-critical data streams in network components of the communication infrastructure to an operation according to a second strategy for forwarding time-critical data streams in the network components as a function of at least one trigger signal, the network component comprising:
 a processor;
 a memory; and
 an interface to the communication infrastructure;
 wherein the network component is configured to:
  receive in an operation according to the first strategy from a control instance, the at least one trigger signal in a trigger message, the trigger message being a multicast message or a unicast message or in a broadcast message;
  check whether or not the second strategy is implementable by the network component; and
  transmit a response message to the control instance in response to the trigger message as a function of a result of the checking, the response message including information about whether or not the second strategy is implementable by the network component;
  check whether an abort message is received by the network component; and
  based on the check, switch the network component from the operation according to the first strategy to the operation according to the second strategy, when no abort message is received, by the network component, by a predefined switching point in time after the receipt of the trigger message.

9. A control instance in a software-defined networking communication infrastructure, wherein the software-defined networking communication infrastructure is switched from an operation according to a first strategy for forwarding time-critical data streams in network components of the communication infrastructure to an operation according to a second strategy for forwarding time-critical data streams in the network components as a function of at least one trigger signal, the control instance comprising:
 a processor;
 a memory; and
 an interface;
 wherein the control instance is configured to:
  determine the at least one trigger signal in an operation according to the first strategy;
  transmit the at least one trigger signal in a plurality of unicast messages or in a broadcast message, to a plurality of network components;
  check whether a response message, which includes information about whether or not the second strategy is implementable, is received from at least one of the plurality of network components in response to the transmission of the trigger message; and
  transmit an abort message by the control instance, in a plurality of unicast messages or in a broadcast message, if the second strategy is not implementable by at least one of the plurality of the network components, or if no information about whether or not the second strategy is implementable is received from at least one of the plurality of the network components by a predefined point in time after the transmission of the trigger message;
  check whether a configuration confirmation message, which confirms that the second strategy is implemented, is received from all network components of the plurality of network components, the abort message being transmitted when the second strategy is not implemented by at least one of the plurality of the network components, or when no configuration confirmation message, which confirms that the second strategy is implemented, is received from at least one of the plurality of the network components by the predefined confirmation point in time after the transmission of the trigger message.

10. A non-transitory computer-readable memory medium on which is stored a computer program including computer-readable instructions for operating a network component in a software-defined networking communication infrastructure, wherein the software-defined networking communication infrastructure is switched from an operation according to a first strategy for forwarding time-critical data streams in network components of the communication infrastructure to an operation according to a second strategy for forwarding time-critical data streams in the network components as a function of at least one trigger signal, the computer-readable instructions, when executed by a computer, causing the computer to perform the following steps:
 receiving, by the network component, in an operation according to the first strategy from a control instance, the at least one trigger signal in a trigger message, the trigger message being a multicast message or a unicast message or in a broadcast message;
 checking, by the network component whether or not the second strategy is implementable by the network component; and
 transmitting, by the network component, a response message to the control instance in response to the trigger message as a function of a result of the checking, the response message including information about whether or not the second strategy is implementable by the network component;
 checking, by the network component, whether an abort message is received by the network component; and
 based on the checking, switching the network component, from the operation according to the first strategy to the operation according to the second strategy, when no abort message is received, by the network component, by a predefined switching point in time after the receiving of the trigger message.

11. A non-transitory computer-readable memory medium on which is stored a computer program including computer-readable instructions for operating a control instance in a software-defined networking communication infrastructure, wherein the software-defined networking communication infrastructure is switched from an operation according to a first strategy for forwarding time-critical data streams in network components of the communication infrastructure to an operation according to a second strategy for forwarding time-critical data streams in network components as a function of at least one trigger signal, the computer-readable instructions, when executed by a computer, causing the computer to perform the following steps:

- determining the at least one trigger signal in an operation according to the first strategy;
- transmitting the at least one trigger signal in a plurality of unicast messages or in a broadcast message, to a plurality of network components;
- checking whether a response message, which includes information about whether or not the second strategy is implementable, is received from at least one of the plurality of network components in response to the transmission of the trigger message; and
- transmitting an abort message, in a plurality of unicast messages or in a broadcast message, if the second strategy is not implementable by at least one of the plurality of the network components, or if no information about whether or not the second strategy is implementable is received from at least one of the plurality of the network components by a predefined point in time after the transmission of the trigger message;
- checking, by the control instance, whether a configuration confirmation message, which confirms that the second strategy is implemented, is received from all network components of the plurality of network components, the abort message being transmitted when the second strategy is not implemented by at least one of the plurality of the network components, or when no configuration confirmation message, which confirms that the second strategy is implemented, is received from at least one of the plurality of the network components by the predefined confirmation point in time after the transmission of the trigger message.

\* \* \* \* \*